United States Patent [19]

Ziminski et al.

[11] 4,197,324

[45] Apr. 8, 1980

[54] PREPARATION OF MEAT ANALOG

[75] Inventors: Richard D. Ziminski, Wayzata; Myron M. Uecker, Buffalo, both of Minn.

[73] Assignee: General Mills, Inc., Minneapolis, Minn.

[21] Appl. No.: 884,058

[22] Filed: Mar. 6, 1978

Related U.S. Application Data

[63] Continuation of Ser. No. 686,601, May 14, 1976, abandoned.

[51] Int. Cl.$^2$ .................................................. A23J 3/00
[52] U.S. Cl. ...................................... 426/249; 426/656; 426/517; 426/516; 426/802; 426/523
[58] Field of Search ............... 426/103, 104, 249, 615, 426/656, 659, 512, 516, 577, 520, 802, 523, 524, 438–441, 517

[56] References Cited

U.S. PATENT DOCUMENTS

| | | | |
|---|---|---|---|
| 3,772,035 | 11/1973 | Carp | 426/656 |
| 3,930,033 | 12/1975 | Corliss et al. | 426/656 |
| 3,999,474 | 12/1976 | Sienkiewicz | 426/802 |
| 4,061,789 | 12/1977 | Warren | 426/656 |
| 4,104,415 | 8/1978 | Shanbhag | 426/656 |

*Primary Examiner*—Hiram H. Bernstein
*Attorney, Agent, or Firm*—Gene O. Enockson; L. MeRoy Lillehaugen

[57] ABSTRACT

A meat-like product is prepared preferably having alternating zones simulating lean strata and fat strata. Internal stresses are established in the analog product thereby providing wrinkling of the product upon final cooking such as by pan frying.

5 Claims, No Drawings

PREPARATION OF MEAT ANALOG

BACKGROUND OF THE INVENTION

This application is a continuation of our earlier filed application Ser. No. 686,601, filed May 14, 1976, and now abandoned.

The present invention relates to food products and more particularly to meat analog food products such as bacon strips.

Sliced fried bacon and fried ham have long been preferred meats for eating at breakfast time. In recent years, concern has developed with regard to bacon, ham and other natural meat products. Such concern has centered on the fact that meat products have a relatively high cholesterol and saturated fat level. This is particularly a problem for certain persons having heart disorders. In view of this and the relatively high cost of meat products, meat analogs have received a good deal of attention. Meat analogs are generally prepared from vegetable protein such as soy flour and/or soy isolate. The fat or oil content of meat analogs can be controlled, and in fact, the cholesterol content can be essentially eliminated. An early bacon analog that has long been commercially available is sold by General Mills, Inc. under the Trademark BACOS. A variety of other bacon-like products have more recently become commercially available.

Because of the high degree of recognition of the various characteristics of bacon, it is desirable to provide the bacon analog with as much similarity to natural bacon as possible. One difficulty that has been encountered in bacon analogs is the fact that the available bacon analogs do not act like bacon during frying. In other words, as natural bacon fries, the slice wrinkles. The bacon analogs previously available, however, have laid flat or bowed slightly in the pan during frying. The present invention overcomes such disadvantages and provides a bacon that acts very much like natural bacon during frying and also more closely simulates the appearance of natural bacon following frying.

THE PRESENT INVENTION

The present invention provides a product that closely simulates bacon or ham and is suitable for frying in commercial establishments or at home. The present simulated bacon product may be prepared by providing two doughs, one being substantially uncolored and resembling in appearance the fat portion of bacon and the other dough containing meat-like coloring (i.e., a red dye or color) resembling in appearance the lean portion of bacon.

The stratified composite may be prepared by simultaneously extruding the two doughs. The resulting laminated product may be heat set such as by being deep fat fried, steamed, baked or the like in order to develop ripples. The product is cooled while ripples are at least partially removed.

The stratified composite may be prepared by making slabs of meat-colored dough and slabs of fat-colored dough. The slabs may be superimposed upon one another in alternating colors. The slabs may be secured to each other by the natural adhesiveness of the dough or by addition of an adhesive material between each of the layers. The composite slab may then be sliced to resemble bacon slices. The slices may be heat set and rippled. After heat setting but prior to cooling, force is applied to the rippled pieces to substantially reduce or eliminate the ripples. The force in this case may be a compressive force applied as the slices cool. When the slices are later reheated, such as by frying or baking, the ripples reappear.

The portion resembling the fat strata may include, for example, a protein isolate such as soybean isolate, a binder such as egg albumin, water, oil and flavoring. The portion resembling the lean strata of bacon may likewise include a protein isolate, a binder such as egg albumin, water, oil and flavoring.

The protein material of the present invention may be any edible material in a particulate form (hydrated, dehydrated or in a slurry) and having at least 50% protein content. The protein material may be obtained from any animal or vegetable source. For example, the protein material may be dehydrated, processed microbial protein, albumin or oil seed protein isolate or concentrate. Illustrative oil seed protein materials are defatted meals and flours of soybean, cottonseed, peanut and sesame. Other suitable protein materials include ground turkey meat, egg protein, fish meal, wheat gluten, yeast, sodium caseinate and the like.

The protein material may be present in the white dough in the range of about 8 to 70%, preferably about 30 to 35% by weight. The terms "percent", "parts" and the like as used herein, will mean by weight based on the total weight of the dough unless otherwise indicated. The protein material may be present in the red dough in the range of about 6 to 60%, preferably 30 to 35%. The protein material in the white portion desirably is a mixture of wheat gluten, egg albumin and defatted soybean material, typically, about 13 parts wheat gluten, 8 parts dry egg albumin and 12 parts defatted soybean isolate. The protein material in the red portion desirably is a mixture of wheat gluten, egg albumin and defatted soybean material, typically, about 17 parts wheat gluten, 4 parts dry egg albumin and 13 parts defatted soybean isolate.

The doughs each contain adequate amounts of water (i.e., moisture) to maintain the protein in a cohesive fused mass. Typically, the white dough may have moisture added in an amount of 15 to 40%, preferably 24%, basis total weight of dough. The red dough may have moisture added in an amount of 20 to 70%, preferably 28%, basis total weight of dough.

Fat or oil may be included in an amount of 15 to 40%, preferably 29% in the white dough and 5 to 30%, preferably 18% in the red dough. The fat or oil may be any edible vegetable or animal oil. It is advantageous to use all vegetable oil since this avoids or reduces the presence of cholesterol. The oil, for example, may be cottonseed oil, soybean oil, corn oil, safflower oil and the like.

The doughs are desirably co-extruded in such a manner that a striated ribbon is produced. The alternating flows of dough may be brought into contact with one another while within a common extrusion die. Alternatively, closely adjacent alternating red and white strips of dough may be extruded and brought into contact with one another following extrusion. In both instances, the flows of dough are sticky and upon contacting one another, fuse together forming a striated ribbon. Any of various pumps, augers and the like may be used to deliver the flow of dough to a die.

The ribbon is conveyed to a hot oil bath having a temperature of between about 220° to 410° F., preferably 275° to 350° F. and partially fried therein for between 100 and 10 seconds, preferably, between 35 and 15 seconds. The moisture content of the fried product may be in the range of 5 to 20%.

Frying develops ripples or wrinkles in the ribbon. After emerging from the oil bath, force is applied to the ribbon, for example, tension is applied to the fried ribbon to substantially remove the wrinkles. While tension is maintained, the ribbon is cooled such as to 150° F. or less. The ribbon may then be cut into pieces of suitable length. At this point, the ribbon has few or no apparent wrinkles. The bacon analog strips maintain a memory and upon reheating, the wrinkles return to the analog strips. It has been found that the present invention may comprise solely a white strip or solely a red strip and still obtain the wrinkling characteristics. In other words, one may prepare a continuous ribbon of white dough having a uniform composition, fry such ribbon to obtain wrinkling and apply force to remove wrinkling while cooling the ribbon. Such a ribbon will maintain a memory and again wrinkle when reheated thus resembling fried pork fat. Similarly, a red ribbon may be prepared which will wrinkle when reheated thus resembling, for example, fried ham.

EXAMPLE I

A bacon analog was prepared according to the present invention by preparing an uncolored dough and a red colored dough. The uncolored dough was prepared by mixing 24 parts water and 8.5 parts dried egg white. Next 29 parts vegetable oil, 6.0 parts flavoring and 0.5 parts melted emulsifier (alpha monoglyceride) were added with mixing. The combination was then thoroughly mixed in a shear pump to remove all lumps. A dry blend was prepared including 13.4 parts wheat gluten, 11.5 parts isolated soy protein, 3.7 parts sucrose and 3.2 parts table salt using a planetary mixer. The oil emulsion was thoroughly dispersed in the dry blend to form a dough having the consistency of a typical cookie dough.

The red dough was prepared by mixing 29 parts water, 0.05 parts red coloring and 4.5 parts dried egg white. Then 18 parts vegetable oil, 10 parts flavoring and 0.5 parts melted emulsifier (alpha monoglyceride) were added with mixing to form an oil emulsion. A dry blend was prepared including 13 parts isolated soy protein, 17.7 parts wheat gluten, 4.9 parts sucrose and 3.0 parts table salt. The oil emulsion was thoroughly dispersed in the dry blend to form a dough.

The uncolored dough and the red dough were co-extruded to produce a flat strip having two red stripes and two white (i.e., uncolored) stripes. The strip was sticky and fragile. The strip was deposited on a conveyor which carried the continuous strip through a deep fat fryer. The fryer was at about 315° F. and the residence time in the fryer was about 20 seconds. The excess oil on the surface of the strip was blown off by a blast of air as the strip was removed from the oil bath. The strip developed significant wrinkles or ripples (i.e., became wavy) during frying due to differential expansion. Immediately following frying, while the strip was still hot and resilient, tension was applied to the strip as the product cooled and stiffened. The product was elongated about 65% in length. It was found that this provided a substantially flat product having internal stresses. The strip was then cut into pieces having a length of about six inches and packaged. The pieces were later placed in a skillet at 350° F. and cooked for about 8 minutes. The skillet had been lightly coated with vegetable oil. The strips were turned over several times during cooking. The strips returned to the wrinkled condition and closely simulated fried bacon.

EXAMPLE II

Example I was repeated, however, the strip was prepared entirely from the white or uncolored dough. The strip became wrinkled during deep fat frying. The wrinkles were removed by applying tension as the strip cooled. The strip was cut into pieces and later fried in a pan. The pieces returned to the wrinkled condition.

EXAMPLE III

A bacon analog was prepared according to the present invention. A white (i.e., uncolored) dough was prepared by dry blending in a planetary mixer 8.5 parts dried egg white, 13.4 parts wheat gluten, 11.5 parts isolated soy protein, 3.7 parts sucrose, 6 parts flavoring and 3.2 parts table salt. While mixing continued, 29 parts vegetable oil, 0.5 parts melted emulsifier (monoglyceride) and 24 parts water were added by streaming in such fluid ingredients.

Similarly, a red dough was prepared by dry blending in a planetary mixer 10 parts flavoring, 0.05 parts red coloring, 4.5 parts dried egg white, 13 parts isolated soy protein, 17.7 parts wheat gluten, 4.9 parts sucrose and 3 parts table salt. While mixing was continued, 18 parts vegetable oil, 0.5 parts melted emulsifier (monoglyceride) and 28 parts water were streamed in. The two doughs were co-extruded to produce a flat, continuous strip having two red stripes and two white stripes. The continuous strip was deep fat fried at about 315° F. for about 20 seconds. The strip developed wrinkles during deep fat frying. Force was applied to the strip during cooling in order to minimize the wrinkling in the product. The strip was cut into pieces and frozen. Later the pieces were thawed and fried in a pan. The pieces returned to the wrinkled condition.

EXAMPLE IV

A bacon analog was prepared according to the present invention by preparing a red dough and an uncolored dough. The uncolored dough was prepared by mixing 24 parts water and 8.5 parts dried egg white. Then 30 parts vegetable oil, 6.0 parts flavoring and 0.5 parts melted alpha monoglyceride were added and dispersed by mixing. A dry blend was prepared including 13.3 parts wheat gluten, 11.6 parts isolated soy protein, 3.7 parts sucrose and 3.2 parts table salt. The oil emulsion was thoroughly dispersed in the dry blend to form a dough. The red dough was prepared by mixing 28 parts water, 0.03 parts red coloring and 4.5 parts dried egg white. Then 18 parts vegetable oil, 10 parts flavoring and 0.3 parts alpha monoglyceride were added to produce an oil emulsion. A dry blend was prepared including 13 parts isolated soy protein, 17.3 parts wheat gluten, 4.8 parts sucrose and 3.0 parts table salt. This oil emulsion was thoroughly dispersed in the dry blend to form a dough. The uncolored dough and the red dough were co-extruded to produce a flat strip having two red stripes and two white or uncolored stripes. The strip was fried in deep oil at 325° F. for six seconds. The wrinkled product was cut into pieces about 5 inches in length. The pieces were placed under a sheet of aluminum and sufficient pressure was applied to flatten the pieces as the strips cooled. After two minutes the pressure was released and the strips were essentially flat. The flat strips were later fried in an oil coated pan at 325° F. for twelve minutes. The original wrinkling reappeared.

The embodiments of the invention in which an exclusive property or privilege is claimed are defined as follows:

1. In the process of preparing a partially cooked, simulated bacon product wherein alternating layers of a substantially uncolored dough comprising from 8 to 70% by weight particulate protein material, 15 to 40% by weight moisture and 15 to 40% of an edible oil or fat and a red colored dough comprising from 6 to 60% by weight particulate protein material, 20 to 70% by weight moisture and 5 to 20% by weight edible oil or fat are brought into contact with one another to form a striated ribbon resembling natural bacon in appearance, the ribbon is partially fried, such partial frying causing the ribbon to develop wrinkles, and the ribbon is cooled, the improvement consisting of applying force to the partially cooked and wrinkled ribbon during cooling thereof to substantially remove the wrinkles and create internal stress within said ribbon.

2. The process of claim 1 wherein the force comprises applying tension to the ribbon to elongate the same.

3. The process of claim 1 wherein said force comprises compressing the ribbon.

4. The process of claim 1 wherein the partial frying is carried out in a hot oil bath at a temperature of about 275° to 410° F. for about 10 to 100 seconds.

5. The partially cooked, simulated bacon product having internal stress prepared by the process of claim 1.

* * * * *